(12) United States Patent
Coleman

(10) Patent No.: US 6,205,785 B1
(45) Date of Patent: Mar. 27, 2001

(54) EXHAUST GAS RECIRCULATION SYSTEM

(75) Inventor: Gerald N. Coleman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/358,620

(22) Filed: Jul. 21, 1999

(51) Int. Cl.$^7$ .................................................. F02M 25/07
(52) U.S. Cl. .................................................... 60/605.2
(58) Field of Search .......................................... 60/605.2

(56) References Cited

U.S. PATENT DOCUMENTS

| | | | |
|---|---|---|---|
| 4,215,550 | 8/1980 | Dinger et al. | 60/606 |
| 4,426,848 | 1/1984 | Stachowicz | 60/605.2 |
| 5,406,796 | * 4/1995 | Hiereth et al. | 60/605.2 |
| 5,564,275 | * 10/1996 | Codan et al. | 60/605.2 |
| 5,611,202 | 3/1997 | Sumser et al. | 60/605.2 |
| 5,657,630 | 8/1997 | Kjemtrup et al. | 60/605.2 |
| 5,771,868 | 6/1998 | Khair | 123/570 |
| 5,791,146 | * 8/1998 | Dungner | 60/605.2 |
| 5,794,445 | * 8/1998 | Dungner | 60/605.2 |

FOREIGN PATENT DOCUMENTS

| | | | |
|---|---|---|---|
| 4231218 | * 9/1993 | (DE) | 60/605.2 |
| 0 889 226 | 6/1998 | (EP) . | |
| 941532 | 9/1961 | (GB) . | |
| 404050433 | 6/1990 | (JP) . | |
| 405071426 | 9/1991 | (JP) . | |
| 428103 | 2/1972 | (SU) . | |
| 98/39563 | 9/1998 | (WO) . | |

OTHER PUBLICATIONS

Abstract of Japan patent 05180089 to Hino Motors, Ltd., Jul. 20,1993.

\* cited by examiner

*Primary Examiner*—Michael Koczo
(74) *Attorney, Agent, or Firm*—Robert J. Hampsch

(57) ABSTRACT

A system and method for exhaust gas recirculation (EGR) in a heavy-duty diesel engine is disclosed. The disclosed EGR system comprises an EGR conduit, an EGR valve, an EGR cooler, and an EGR driver such as an auxiliary compressor driven by the exhaust gas driven turbine of the engine to forcibly drive the recirculated exhaust gas from the exhaust manifold via an EGR conduit to the intake manifold when the EGR valve is open. The disclosed EGR system also includes an EGR bypass conduit, the flow through which is governed by an electronically controlled EGR bypass valve. The EGR system also includes an ECM that controls the EGR bypass valve such that a flow of exhaust gas is directed through the EGR conduit and EGR driver during selected engine operating conditions where the primary EGR valve is open (i.e. EGR is on) and directs a flow of air from the intake through the EGR bypass conduit and EGR driver when EGR valve is closed (i.e. EGR is off). In addition, the ECM optionally controls the EGR bypass valve such that a flow of exhaust gas from the exhaust manifold is directed through the EGR bypass conduit to the intake manifold when the exhaust manifold pressure is greater than the intake manifold pressure.

18 Claims, 2 Drawing Sheets

EXHAUST GAS RECIRCULATION SYSTEM

TECHNICAL FIELD

The present invention relates an exhaust gas recirculation (EGR) system and method for use in a heavy duty diesel engine, and more particularly, an EGR system and method that includes an EGR bypass conduit and EGR bypass valve operatively controlled to improve the performance, durability, and reliability of the EGR system.

BACKGROUND OF THE INVENTION

Exhaust gas recirculation (EGR) is a technique commonly used for controlling the generation of undesirable pollutant gases and particulate matter in the operation of internal combustion engines. This technique has proven particularly useful in internal combustion engines used in motor vehicles such as passenger cars, light duty trucks, and other on-road motor equipment. The EGR technique primarily involves the recirculation of exhaust gas by-products from the combustion process into the intake air supply of the internal combustion engine. The exhaust gas reintroduced to the engine cylinders acts to reduce the concentration of oxygen therein, which in turn lowers the maximum combustion temperature within the cylinder and slows the chemical reaction of the combustion process, decreasing the formation of nitrous oxides or NOx.

When utilizing EGR in a turbocharged diesel engine, the exhaust gas to be recirculated is typically removed upstream of the exhaust gas driven turbine associated with the turbocharger. For example, in many EGR applications the exhaust gas is diverted directly from the exhaust manifold and diverted via an EGR conduit to the intake system. Likewise, the recirculated exhaust gas is preferably re-introduced to the intake air stream downstream of the compressor and inter-cooler or air-to-air aftercooler. Reintroducing the exhaust gas downstream of the compressor and intake air cooler device is preferred due to the reliability and maintainability concerns that arise should the exhaust gas be passed through the compressor and/or intake air cooler.

At many engine operating conditions within a turbocharged diesel engine, there is a pressure differential between the intake manifold and the exhaust manifold which essentially prevents many such simple EGR systems from being utilized. For example, at low speed and/or high load operating conditions in a turbocharged engine, the exhaust gas does not readily flow from the exhaust manifold to the intake manifold. Therefore many EGR systems include an EGR driver such as a Roots-type blower or an auxiliary compressor to force the exhaust gas from the exhaust manifold to the higher pressure intake manifold. See U.S. Pat. No. 5,657,630 (Kjemtrup et al.) as merely one example of the many EGR systems that utilize a pump or blower type arrangement to drive the EGR from the exhaust manifold to the intake system. See also European Patent Application No. EP 0 889 226 A2 as well as PCT patent document WO 98/39563 that disclose the use of an auxiliary compressor wheel driven by the exhaust gas driven turbine associated with the turbocharged diesel engine. The auxiliary compressor wheel forcibly drives the recirculated exhaust gas from the exhaust manifold to the intake system at nearly all engine operating conditions.

One apparent problem with such forced EGR systems that utilize an auxiliary compressor is that the auxiliary compressor chokes long before the EGR flow requirements are at met at many light load operating conditions. Such light load operating conditions yield conditions where the exhaust manifold pressure is higher than the intake manifold pressure and the auxiliary compressor, blower, pump or other EGR driver is more of a flow restriction than an assist.

In addition, the reliability and durability of such conventional EGR systems that utilize such EGR driver means is suspect due to the failures attributable to the EGR driver components that are not sized properly to cover all operating conditions. What is needed therefor is a simple and inexpensive improvement to such forced EGR systems that improves the overall EGR system performance while minimizing the likelihood of EGR driver failures. Such an improvement or improved technique should be operable over the entire operating regime or operating conditions for such turbocharged diesel engine. In other words, the simple improvement and improved technique should further be operable over the entire range of engine speeds, loads, and inlet or exhaust temperatures and pressures.

One apparent problem with such forced EGR systems that utilize an auxiliary compressor is that the auxiliary compressor requires some flow of air therethrough to minimize the probability of compressor surge condition. A surge condition may cause premature failure to the auxiliary compressor wheel and possibly to the intake air compressor wheel, if one is used. Thus, when the EGR flow is restricted, many such forced EGR systems are prone to early failure. In other words, the reliability and durability of such conventional EGR systems that utilize such auxiliary compressor is suspect due to the failures attributable to the auxiliary compressor components that are not sized properly to cover all operating conditions, and in particular where EGR is off. What is needed therefor, is a simple and inexpensive improvement to such forced EGR systems that improves the overall EGR system performance while minimizing the likelihood of EGR driver failures. Such an improvement or improved technique should be operable over the entire operating regime or operating conditions for such turbocharged diesel engine. More importantly, what are needed are improvements to such existing EGR systems that provide reliable and durable designs of an EGR system. The present invention is directed at overcoming one or more of the problems set forth above.

DISCLOSURE OF THE INVENTION

The present invention may be characterized as a system and method for exhaust gas recirculation (EGR) in an internal combustion engine, such as a heavy-duty diesel engine. The disclosed EGR system comprises an EGR conduit extending in flow communication between the exhaust manifold and the intake manifold, an EGR valve disposed proximate the exhaust manifold and adapted for controlling (e.g. on/off) the exhaust gas flow through the EGR conduit. The EGR system also includes an EGR driver disposed along the EGR conduit, the EGR driver being adapted for forcibly driving the recirculated exhaust gas from the exhaust manifold to the intake manifold when the EGR valve is open. The EGR system also includes an EGR bypass conduit and EGR bypass valve in flow communication with the EGR conduit in a manner that allows a flow to circumvent the EGR driver. In the disclosed EGR system, the EGR driver is most any means for forcibly driving the recirculated exhaust gas from the exhaust manifold to the intake manifold including, but not limited to an auxiliary compressor driven by the exhaust gas driven turbine or a simple mechanical blower or pump system driven by the crankshaft of the engine or some auxiliary power device associated with the engine.

The present invention may also be characterized as a method for controlling an EGR system similar to the above-described EGR system. In the disclosed method, the EGR system would preferably include an engine control module (ECM) that is adapted to control various flows through the EGR system, and in particular, the ECM controls the EGR bypass valve such that a flow of exhaust gas is directed through the EGR conduit and EGR driver during selected engine operating conditions where the primary EGR valve is open (i.e. EGR is on). Conversely, the ECM controls the EGR bypass valve such that a flow of air from the intake manifold is directed through the EGR bypass conduit and EGR driver during selected engine operating conditions where the primary EGR valve is closed (i.e. EGR is off). In addition, the ECM optionally controls the EGR bypass valve such that a flow of exhaust gas from the exhaust manifold is directed through the EGR bypass conduit to the intake manifold when the exhaust manifold pressure is greater than the intake manifold pressure.

Finally, the present invention may be characterized as an improvement to known EGR systems that utilize an EGR driver means, and in particular, an auxiliary compressor driven by the exhaust gas driven turbine of the engine. As an EGR improvement apparatus, the invention comprises an EGR bypass conduit in flow communication with the EGR conduit at a first location upstream of the EGR driver and a second location downstream of the EGR driver. The improvement apparatus further includes an EGR bypass valve disposed along the EGR bypass conduit for controlling flow through the EGR conduit. In one mode, the EGR bypass valve restricts flow through the EGR bypass conduit such that the flow of exhaust gas is directed through the EGR conduit and EGR driver during selected engine operating conditions where EGR is on. In a second mode, the EGR bypass valve opens to allow a flow of air from the intake manifold through the EGR bypass conduit and EGR driver during selected engine operating conditions where the EGR is off.

BRIEF DESCRIPTION OF THE DRAWINGS

The above and other aspects, features and advantages of the present invention will be more apparent from the following more particular description thereof, presented in conjunction with the following drawings, wherein.

Corresponding reference numbers indicate corresponding components throughout the several views of the drawings.

PREFERRED EMBODIMENT OF THE INVENTION

The following description is of the best mode presently contemplated for carrying out the invention. This description is not to be taken in a limiting sense but is made merely for the purpose of describing the general principals of the invention. The scope and breadth of the invention should be determined with reference to the claims.

Figure 1:
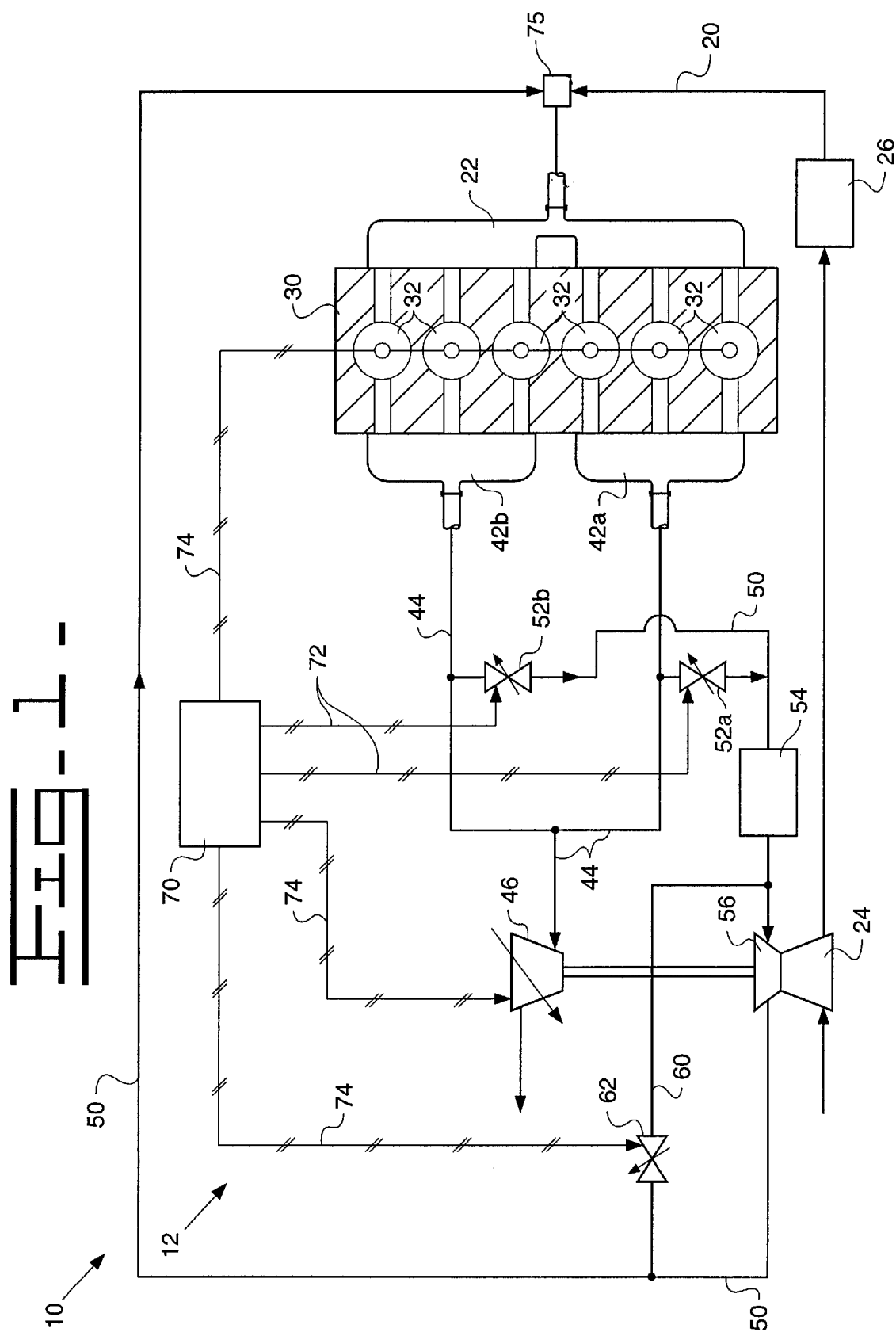
FIG. 1 depicts a schematic diagram of an internal combustion engine incorporating the exhaust gas recirculation system in accordance with the present invention.

Turning to the drawings and particularly FIG. 1, there is shown a schematic diagram of an internal combustion engine 10 having the present EGR system 12. For ease of description, the illustrated engine 10 can be viewed to include four basic systems, namely the intake air system, the main combustion system, the exhaust air system, and an EGR system.

The intake air system of the engine 10 includes an intake air conduit 20, an intake manifold 22, intake air pressurizing device (e.g. compressor) 24, and an inter-cooler or an air to air aftercooler 26. The engine 10 also includes a main combustion system that includes, among other elements, an engine block 30 and a cylinder head (not shown) forming a plurality of combustion cylinders therein 32. Although not shown, there is associated with each of the combustion cylinders: a fuel injector, a cylinder liner, at least one air intake port and corresponding intake valves, at least one exhaust gas port and corresponding exhaust valves, and a reciprocating piston moveable within each combustion cylinder to define, in conjunction with the cylinder liner and cylinder head, the combustion chamber.

The engine 10 also includes an exhaust gas system that, as illustrated, includes a split exhaust manifold 42a, 42b, one or more exhaust conduits 44, and an exhaust gas driven variable geometry turbine 46 that drives the primary intake air compressor 24. The illustrated EGR system 12 includes one or more EGR conduits 50, a pair of EGR valves 52a, 52b, an EGR cooler 54, and an EGR driver 56 shown as an auxiliary compressor driven from the exhaust gas driven turbine 46. The illustrated EGR system 12 also includes an EGR bypass conduit 60 and an EGR bypass valve 62.

Finally, the engine 10 includes an engine control module (ECM) 70 for operatively controlling the fuel injection timing, intake air system operation, exhaust gas system operation, and EGR system operations, including the control of various engine valves 62, 52a, 52b, and the actuation of the variable geometry turbocharger (VGT) 46 if one is employed. All such engine system controlled operations are governed by the ECM 70 in response to one or more measured or sensed engine operating parameters, which are typically inputs (not shown) to the ECM 70.

As seen in FIG. 1, the EGR system 12 includes one or more EGR conduits 50 extending between selected locations in the exhaust system and the intake air system. The illustrated EGR system 12 also includes a pair of proportional EGR valves 52a, 52b, each associated with an exhaust manifold 42a, 42b, the twin EGR valves 52a, 52b being positioned (full open, full closed, and various intermediate positions) preferably by a single actuator (not shown) in response to control signals 72 from the ECM 70. The EGR system 12 preferably includes an EGR cooler 54 disposed upstream of an EGR driver as well as an EGR/intake air mixer 75 adapted to re-combine the EGR with the intake air prior to introduction into the intake manifold 22. As is well known in the EGR art, the EGR cooler 54 may include an air to gas cooler, a water to gas cooler or even an oil to gas cooler properly sized to provide the necessary EGR cooling. The EGR driver 56 is represented by an auxiliary compressor device driven by an exhaust gas driven turbine 46 associated with the preferred turbocharged diesel engine. Such EGR driver systems are commonly known and used in various EGR designs. See for example European Patent Application No. EP 0 889 226 A2 as well as PCT patent document WO 98/39563.

More importantly, the illustrated EGR system 12 also includes an EGR bypass conduit 60, an on/off EGR bypass valve 62, and an ECM 70 adapted to operatively control the flows through the EGR system 12 by cooperatively controlling the primary EGR valves 52a, 52b together with the EGR bypass valve 62. The EGR bypass conduit 60 is preferably connected in flow communication with the EGR conduit 50 at a first location upstream of the EGR driver 56 and also connected in flow communication with the EGR conduit 50 at a second location downstream of the EGR driver 56. The illustrated EGR bypass valve 62 is preferably disposed along the EGR bypass conduit 60 in a 'parallel' orientation relative to the EGR driver 56. As indicated herein, the EGR bypass valve 62 is preferably an electronically controlled on/off valve adapted for controlling flow through the EGR bypass conduit 60 in response to signals 74 from the ECM 70 indicative of selected engine operating conditions. Alternatively, the EGR bypass valve 62 could be a simple check-valve or pressure relief valve that opens and allows EGR flow from the exhaust manifold 42 to bypass the EGR driver 56 when the exhaust manifold pressure is naturally higher than the intake manifold pressure. Conversely, when the intake manifold pressure is higher than the exhaust manifold pressure, the EGR bypass valve 62 closes to prevent flow through the EGR bypass conduit 60 forcing the EGR to be forcibly driven to the intake system by means of the EGR auxiliary compressor or other EGR driver 56.

Although the present EGR system 12 is shown on a four stroke, direct injection, electronically controlled, heavy-duty diesel engine, numerous other engine types, including medium duty diesel engines, light duty diesel engines, alternate fuel engines, two stroke diesel engines, dual fuel engines, etc. are likewise contemplated as suitable engine platforms with which the disclosed invention may be used. In addition, the engine platform may come in a number of different engine configurations including "in-line" and "V" type engines and further having various numbers of cylinders. Furthermore, although the embodiments are shown with split exhaust manifolds, and single actuated, twin EGR valves, numerous other configurations are possible including single manifolds and/or single EGR valve. Likewise, the use of a variable geometry turbocharger can easily be interchanged with other more conventional turbochargers or similar such supercharging devices.

Figure 2:
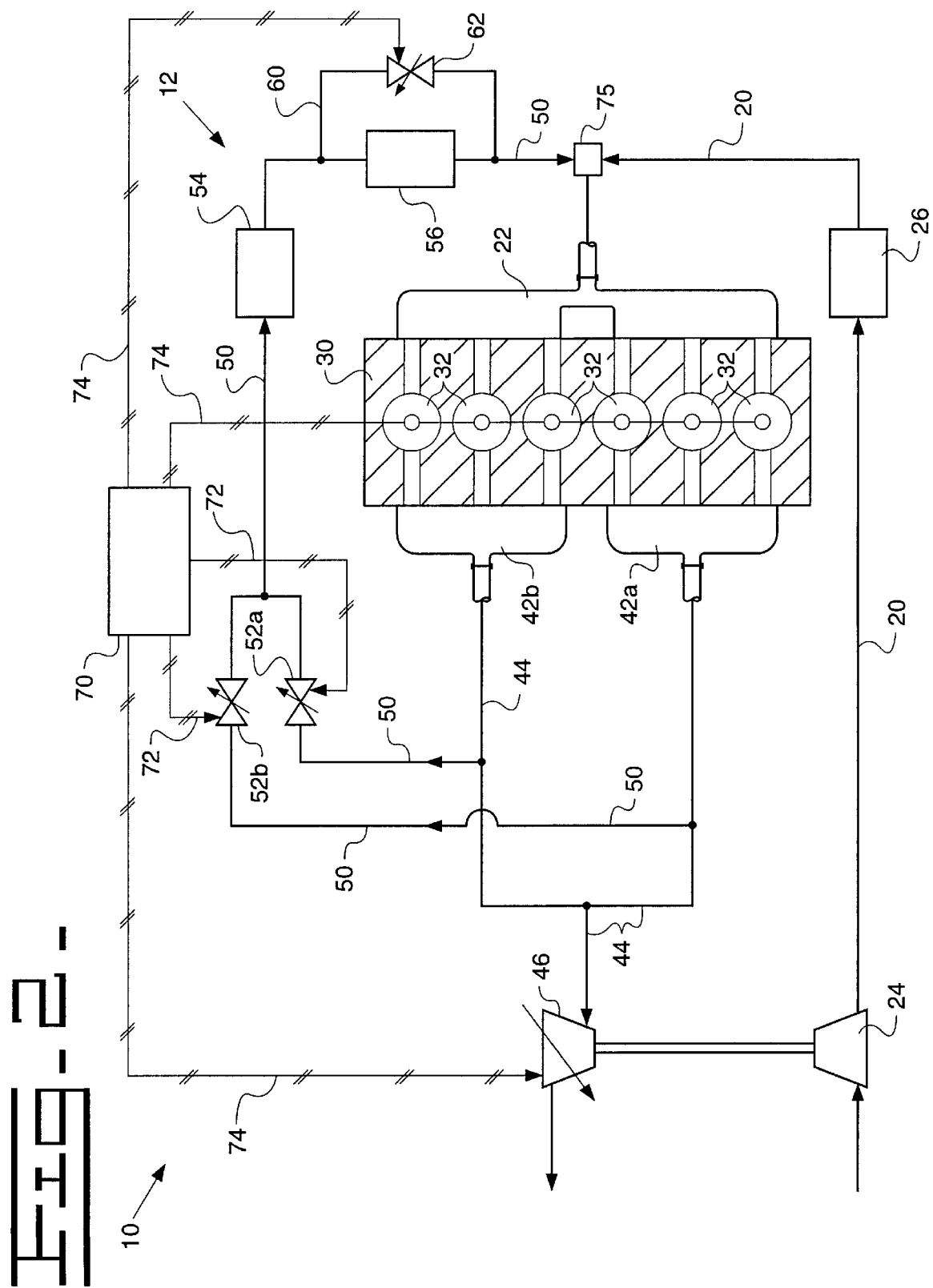
FIG. 2 depicts a schematic diagram of an alternate embodiment of the exhaust gas recirculation system of the present invention.

Turning now to FIG. 2, there is shown another schematic of a turbocharged engine incorporating an alternate embodiment of the present EGR system. Much of the engine system shown in FIG. 2 is identical to that shown and described with reference to FIG. 1, and for that reason, the description will not be repeated here. The main differences in the two illustrated embodiments are found in the EGR system of the illustrated engine schematics. Like the embodiment of FIG. 1, the illustrated EGR system of FIG. 2 depicts one or more EGR conduits extending between selected locations in the exhaust system and the intake air system. The EGR system of FIG. 2 also includes one or more EGR valves, that operate to shut off the EGR flow or alternatively allow EGR flow from the exhaust manifold to the intake air system in response to selected engine operating conditions. The EGR system of FIG. 2 also includes an EGR cooler, an EGR bypass conduit, an EGR bypass valve, and an ECM adapted to operatively control the flows through the EGR system. Unlike the embodiment of FIG. 1, the EGR driver is represented by a conventional Roots-type blower 56 driven by the crankshaft of the engine. Alternatively, the EGR driver may be any similar such mechanical device driven by the crankshaft of the engine or other auxiliary power device associated with the engine.

The preferred configuration of the EGR bypass conduit and EGR bypass valve relative to the EGR driver are similar to those described with reference to FIG. 1. In other words, the EGR bypass conduit is connected in flow communication with the EGR conduit at a first location upstream of the Roots-type blower and also connected in flow communication with the EGR conduit at a second location downstream of the EGR driver. The EGR bypass valve is preferably disposed along the EGR bypass conduit in a 'parallel' orientation relative to the EGR driver. The EGR bypass valve is preferably an electronically controlled valve adapted for controlling flow through the EGR bypass conduit in response to signals from the ECM indicative of selected engine operating conditions. As described herein, the flow through the open EGR bypass valve and EGR bypass conduit may include recirculated exhaust gases in some engine operating conditions (namely when exhaust manifold pressure is greater than intake manifold pressure), or may include back-flow intake air needed to keep a flow of air moving through the EGR driver. Conversely, the flows through the EGR bypass valve and EGR bypass conduit may be shut down in selected engine operating conditions by merely closing the EGR bypass valve and directing any EGR through the EGR driver.

Industrial Applicability

In operation the above-described EGR system and associated method of controlling such EGR system includes the basic steps of: (a) directing a flow of exhaust gas from the exhaust manifold through the EGR conduit and the EGR driver at a first set of engine operating conditions when the exhaust gas is to be recirculated to the intake system; and (b) directing a back-flow or bypass flow of intake air through the EGR bypass conduit and the EGR driver at a second set of engine operating conditions when exhaust gas is not to be recirculating from the exhaust manifold to the intake manifold. The above-described first set of engine operating conditions corresponds to selected engine operating conditions where the EGR valve is open (i.e. EGR is on), and the exhaust gas flow through the EGR driver is accomplished by closing the EGR bypass valve thereby restricting any flow through the EGR bypass conduit.

On the other hand, the above-described second set of engine operating conditions corresponds to selected engine operating conditions where the primary EGR valve is closed (i.e. EGR is off). In such operating conditions the intake air flow or bypass flow through the EGR bypass conduit to the EGR driver is accomplished by opening the EGR bypass valve thereby allowing intake air to loop or recirculate through the EGR driver and always keeping an active flow through the EGR driver.

In addition, the present EGR system and associated method of controlling the same includes the step of directing a flow of exhaust gas from the exhaust manifold through the EGR conduit and EGR driver as well as through the EGR bypass conduit to the intake system at a third set of engine operating conditions when the exhaust manifold pressure is greater than the intake manifold pressure. The result is an increase in EGR rate when the exhaust manifold pressure is higher than the intake manifold pressure. This allows the auxiliary compressor, pump or other EGR driver to be sized for the rated or full load operating condition where the exhaust manifold pressure is lower than the intake manifold pressure and the EGR driver is needed. Without the use of the EGR bypass valve, the EGR driver or pump capacity would be too low at high speeds and low loads operating conditions. When EGR is off (i.e. shut off at the primary EGR valves), the EGR bypass valve would remain open to allow flow across the EGR driver and prevent damage associated with the compressor going into surge.

From the foregoing, it can be seen that the disclosed invention is an exhaust gas recirculation system for an internal combustion engine that includes an EGR bypass conduit and EGR bypass valve for improving the performance, durability, and reliability of conventional EGR systems. While the invention herein disclosed has been described by means of specific embodiments and processes associated therewith, numerous modifications and variations could be made thereto by those skilled in the art without departing from the scope of the invention as set forth in the claims.

What is claimed is:

1. An exhaust gas recirculation system for an internal combustion engine comprising:

an exhaust gas recirculation primary conduit fluidically coupling an exhaust manifold with an intake manifold;

an exhaust gas recirculation valve disposed along said exhaust gas recirculation primary conduit proximate said exhaust manifold;

an exhaust gas recirculation driver disposed along said exhaust gas recirculation conduit and adapted for forcibly driving said recirculated exhaust gas to said intake manifold;

an exhaust gas recirculation bypass conduit in fluidic communication with said exhaust gas recirculation primary conduit while circumventing said exhaust gas recirculation driver; and an exhaust gas recirculation bypass valve disposed along said exhaust gas recirculation bypass conduit.

2. The exhaust gas recirculation system of claim 1 wherein said exhaust gas recirculation driver is a compressor driven by an exhaust gas driven turbine.

3. The exhaust gas recirculation system of claim 1 wherein said exhaust gas recirculation driver is a blower driven by a crankshaft of said engine.

4. The exhaust gas recirculation system of claim 1 further comprising an engine control module adapted to control flows through said exhaust gas recirculation system in response to various engine operating conditions; and wherein said exhaust gas recirculation bypass valve is an electronically controlled valve having a first position that allows flow through said exhaust gas recirculation bypass conduit and a second position that restricts flow through said exhaust gas recirculation bypass conduit.

5. The exhaust gas recirculation system of claim 4 wherein said exhaust gas recirculation bypass valve is oriented in said first position when said exhaust gas recirculation valve is shut.

6. The exhaust gas recirculation system of claim 4 wherein said exhaust gas recirculation bypass valve is oriented in said first position when the pressure in said exhaust manifold is greater than the pressure in said intake manifold.

7. The exhaust gas recirculation system of claim 1 wherein said exhaust gas recirculation bypass valve is a pressure relief valve that opens when the pressure in said exhaust manifold is greater than the pressure in said intake manifold.

8. In an exhaust gas recirculation system for an engine having an intake manifold, an exhaust manifold, an exhaust gas recirculation conduit, an exhaust gas recirculation cooler, an exhaust gas recirculation valve, and an exhaust gas recirculation driver, an improvement to said exhaust gas recirculation system comprising:

an exhaust gas recirculation bypass conduit in flow communication with said exhaust gas recirculation conduit at a first location upstream of said exhaust gas recirculation driver and a second location downstream of said exhaust gas recirculation driver; and an exhaust gas recirculation bypass valve disposed along said exhaust gas recirculation bypass conduit for controlling flow through said exhaust gas recirculation bypass conduit.

9. The improvement of claim 8 wherein said exhaust gas recirculation driver is a compressor driven by an exhaust gas driven turbine.

10. The improvement of claim 8 wherein said exhaust gas recirculation driver is a blower driven by a crankshaft of said engine.

11. The improvement of claim 8 further comprising an engine control module adapted to control flows through said exhaust gas recirculation system in response to various engine operating conditions and wherein said exhaust gas recirculation bypass valve is an electronically controlled valve having a first position that allows flow through said exhaust gas recirculation bypass conduit and a second position that restricts flow through said exhaust gas recirculation bypass conduit.

12. The improvement of claim 11 wherein said exhaust gas recirculation bypass valve is oriented in said first position when said exhaust gas recirculation valve is shut.

13. The improvement of claim 11 wherein said exhaust gas recirculation bypass valve is oriented in said first position when the pressure in said exhaust manifold is greater than the pressure in said intake manifold.

14. The improvement of claim 8 wherein said exhaust gas recirculation bypass valve is pressure relief valve that is open when the pressure in said exhaust manifold is greater than the pressure in said intake manifold.

15. A method of controlling an exhaust gas recirculation system of an internal combustion engine having an intake manifold, an exhaust manifold, an exhaust gas recirculation conduit, an exhaust gas recirculation valve, and an exhaust gas recirculation driver, said method comprising the steps of:

directing a flow of exhaust gas through said exhaust gas recirculation conduit and said exhaust gas recirculation driver at a first set of engine operating conditions when said exhaust gas is recirculated from said exhaust manifold to said intake manifold; and directing a bypass flow through an exhaust gas recirculation bypass conduit and said exhaust gas recirculation driver at a second set of engine operating conditions when said exhaust gas is not recirculating from said exhaust manifold to said intake manifold, said exhaust gas recirculation bypass conduit being disposed in flow communication with said exhaust gas recirculation conduit at a first location upstream of said exhaust gas recirculation driver and a second location downstream of said exhaust gas recirculation driver.

16. The method of claim 15 wherein said first set of engine operating conditions corresponds to engine operating conditions where said exhaust gas recirculation valve is open.

17. The method of claim 15 wherein said second set of engine operating conditions corresponds to engine operating conditions where said exhaust gas recirculation valve is closed.

18. The method of claim 15 further comprising the step of directing a flow of exhaust gas from said exhaust manifold through said exhaust gas recirculation bypass conduit to said intake manifold when said exhaust manifold pressure is greater than said intake manifold pressure.

* * * * *